United States Patent Office 3,262,977
Patented July 26, 1966

3,262,977
N-ARALKYL-1,1-DIPHENYL-PROPYLAMINE DERIVATIVES
Kálmán Harsányi, Dezsö Korbonits, Kálmán Takáts, László Tardos, and György Leszkovszky, Budapest, Hungary, assignors to Chinoin Gyógyszer-és Vegyeszeti Termékek Gjyára RT., Budapest, Hungary
No Drawing. Filed Aug. 20, 1962, Ser. No. 218,132
Claims priority, application Hungary, Mar. 10, 1962, CI 387; Mar. 30, 1962, CI 389
9 Claims. (Cl. 260—570)

This invention is concerned with new propylamine derivatives which may be used as therapeuticals and with processes for their preparation.

It has been found according to the present invention, that compounds of the general formula

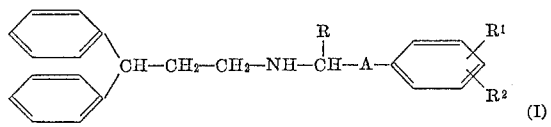

(where R stands for an alkyl group, $R^1$ and $R^2$ stand for hydrogen, an oxy group, an alkoxy group or a dialkylamino group, while A stands for an ethyl group or a valency bond or in compounds where R stands for an ethyl group A may stand also for a methylene group), which are new compounds hitherto unknown from chemical literature are effective as coronary dilatants alone or in combination with other vasodilatants, tranquillants, narcotics and reserpine-like compounds.

Compounds were found especially useful where R stands for an alkyl group with less than 4 carbon atoms. Compounds where $R^1$ stands for an oxy group in para or meta position of for an alkoxy group containing 1 to 3 carbon atoms were found to have valuable pharmaceutical properties. An other preferred group of the compounds of the invention are those where $R^1$ stands for a dialkyl group e.g. dimethylamino, diethylamino etc. while $R^2$ stands for a hydrogen atom.

It has been found further according to the present invention, that compounds of the Formula I may be prepared when (a) Reacting γ,γ-diphenyl-propylamine with ketones of the general formula

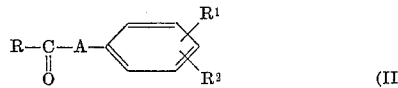

with simultaneous or subsequent reduction, or when (b) Reacting β,β - diphenyl - propionaldehyde with amines of the formula

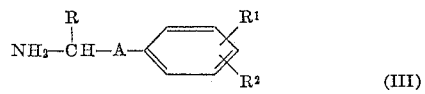

with simultaneous or subsequent reduction, or when (c) Reacting diphenylmethane with amines of the formula

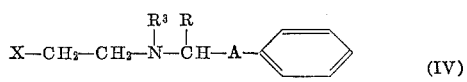

in the presence of agents capable to bind halogen hydrogen (where X stands for halogen and $R^3$ stands for hydrogen or a benzyl group) and if desired splitting off the benzyl group by way of catalytical hydrogenolysis, or when (d) Reacting diphenylacetonitrile with compounds of Formula IV in presence of compounds capable to bind halogen hydrogen and subsequently eliminating the nitrile group and if desired the benzyl group be catalytical hydrogenolysis.

The new compounds according to the invention are also provided in the form of their salts. The salts may be prepared by means of organic or inorganic acids and are preferred when soluble derivatives are aimed at. The free base may be set free from the salts by way of their alkalization. Thus salts may be prepared e.g. with the following acids: hydrohaloid acids such as hydrochloric acid, sulphuric acid, maleic acid, lactic acid, gluconic acid, citric acid, ascorbic acid. The tartarates may be prepared as well.

When carrying out version (a) of the process according to the invention reduction may be brought about by way of hydrogenation in the presence of a catalyst. The reaction is carried out preferably in presence of an organic solvent. Methanol, anhydrous or aqueous ethanol, ethyl acetate, dioxane, tetrahydrofurane may be used as solvents. The reaction is carried out preferably at temperatures between 25 to 80° C. Raney nickel and palladium are used advantageously as catalysts, precipitated on charcoal or on barium sulphate. Platinum may be used as catalyst too.

Reduction may be carried out however by means of nascent hydrogen e.g. with sodium in alcohol or with sodium amalgamate or by means of complex metal hydrides e.g. with calcium borohydride, sodium borohydride, lithium borohydride, lithium aluminium hydride, etc.

Reaction of β,β-diphenylpropionaldehyde and amines of the Formula III is carried out generally the same way as described for method (a), i.e. by means of simultaneous or subsequent reduction which may be accomplished by catalytical hydrogenation or by means of nascent hydrogen. When hydrogenating in the presence of a catalyst it is preferable to react the reagents in stoichiometrical quantities preferably in the presence of an organic solvent. Anhydrous ethanol, 96 percent aqueous ethanol, methanol, ethyl acetate, dioxane, tetrahydrofurane etc. may be used as solvents. The temperature range of the reaction depends on the solvent employed and covers the interval between 15 to 70° C. The reaction may be brought into effect using atmospherical pressure or a slight overpressure.

When carrying out method (c) of the process it is preferred to work in presence of sodium amide as a catalyst and using an inert solvent e.g. benzene or toluene as a medium.

The compounds of the invention may be administered in doses of about 0.015 mg. For this purpose the free base or one of its salts may be finished in the form of tablets, dragées, suppositories, capsules, powder-mixtures, solutions, suspensions, injections, by known methods, if desired after addition of additional compounds, so as to obtain compounds ready for use.

Further details of the process are to be found in the examples.

*Example 1*

21.13 g. of γ,γ-diphenyl-propylamine and 12.01 g. of acetophenone are hydrogenated in 200 ml. of methanol at 55° C. and a pressure of 10 atm. in the presence of palladium charcoal. On filtration of the catalyst the solution is concentrated and the remainder is distilled in vacuo at a pressure of 0.3 Hg mm. The main distillate is collected at 206–210° C. 25.38 g. of N-[1'-phenyl-ethyl-(1')]-1,1-diphenyl-propyl-(3)-amine are obtained.

The product is dissolved in 134 ml. of 96 percent ethanol whereupon 26.8 ml. of concentrated hydrochloric acid and 201 ml. of water are added while cooling with ice-water. The precipitate is filtered off and dried in vacuo at 100° C. 22.98 g. of N-[1'-phenyl-ethyl-(1')]1,1-diphenyl - propyl - (3) - amine-hydrochloride are obtained. M.P. 200–201° C. On recrystallization from 285 ml. of a 2:1 mixture of water and 96% ethanol the melting point remains unchanged.

Tested by the method of Nieschultz et al. (Arzneimittel-forschung, 5, 680–695) on rats, the compound shows a coronary dilatant effect ($ED_{50}=5$ mg./kg.). Applied in doses of 2 mg./kg. on in situ heart preparations of dogs, it shows a coronary dilatant effect as well. On application of 1 mg./kg. and 2 mg./kg. of the product, the initial resistance decreases to 76.5 and 67.0% respectively. Applied in doses of 1 mg./kg. the blood pressure of cats narcotized with chloralose-urethane sinks with 20 to 30 Hg mm.

In a concentration of $2.5 \times 10^{-6}$, the product hinders the spasm caused by acetylcholine or barium chloride, on the isolated intestine of guinea pigs. Troxcity $DL_{50}=14.5$ mg./kg., by intravenous use and 950 mg./kg. per oral administration (in suspension), on mice. During a six week period of daily oral doses of 10 mg./kg. of the product to young rats, no metabolic or tissular harm could be observed.

*Example 2*

15.83 g. of γ,γ-diphenyl-propylamine and 10.06 g. of propiophenone are hydrogenated in 200 ml. of methanol at 55° C. and a pressure of 10 atm. in the presence of palladium charcoal as a catalyst. On filtration of the catalyst the solvent is evaporated. 17.42 g. of N-[1'-phenyl-propyl-(1')] - 1,1-diphenyl-propyl-(3)-amine boiling at 215–217° C. (0.6 Hg mm.) are obtained.

On addition of a solution containing 50% of ethanol and 50% of diluted hydrochloric acid the hydrochloric acid salt melting at 207–208° C. is obtained from the main distillate. This salt may be recrystallized from a mixture of one part anhydrous alcohol and one part ethyl acetate. Analysis: C percent=79.05, H percent=7.69, N percent=5.89 (calc.: C percent=78.77, H percent=7.71, N percent=3.83).

Examined with the method of Example 1, the product shows a coronary dilatant effect on rats. $DL_{50}=5$ mg./kg. by intravenous use. Doses of 1 mg./kg. decrease the blood pressure with 30 Hg mm. of cats narcotized with chloralose-urethane.

*Example 3*

3.15 g. of β,β-diphenyl-propionaldehyde and 1.93 ml. of α-phenyl-ethyl-amine are mixed and heated for 20 minutes in a water bath. The reaction mixture is then hydrogenated in 30 ml. of ethyl acetate in the presence of palladium charcoal as a catalyst. The volume of hydrogen absorbed corresponds to the calculated value. On filtration of the catalyst the product is separated by addition of hydrochloric acid. 3.87 g. of N-(1'-phenyl-ethyl-[1']) - 1,1 - diphenyl-propyl-(3)-amine-hydrochloride are obtained.

*Example 4*

15.9 g. of γ,γ-diphenyl-propylamine and 11.1 g. of ethyl-benzyl-ketone are hydrogenated in 200 ml. of ethanol at 55° C. and a pressure of 10 atmospheres in the presence of palladium charcoal. On filtration of the catalyst, the solvent is distilled off. Without any further purification, the crude base is used for production of the maleic acid salt. From the residue obtained on concentration the salt is produced with 20.40 g. maleic acid in the mixture of 140 ml. 96% alcohol and 210 ml. of water. The solution is heated till boiling and treated with charcoal. It crystallizes on inoculation. 26.58 g. of N-[1'-phenyl - butyl-(2')]-1,1-diphenyl-propyl-(3)-amine maleate are obtained, melting in crude state at 118–210° C. On crystallization from the mixture of 30 absolute alcohol and 120 ml. ethyl acetate, 19.72 g. of the product are obtained. M.P.: 129–130° C. Analysis: C percent=75.65, H percent=7.05 (calc.: C percent=75.95, H percent=7.03).

When applied in doses of 1 mg./kg. and 2 mg./kg. with the method described in Example 1, the resistance of dogs sinks to 78 and 69% respectively; toxicity on rats: $DL_{50}=32$ mg./kg. by intravenous use.

*Example 5*

15.9 g. of γ,γ-diphenyl-propylamine and 11.1 g. of benzyl acetone are hydrogenated in 200 ml. of methyl alcohol at 55° C. on atmospheric pressure in the presence of palladium charcoal as a catalyst. On filtration of the catalyst, the solvent is distilled off and to the crude base thus obtained 25 ml. of benzene and 6.5 ml. of anhydrous alcohol containing hydrogen chloride are added. The product crystallizes when cooled. On filtration it is recrystallized from ethyl acetate to yield N-[1'-phenyl-butyl-(3')]-1,1-diphenyl-propyl-(3)-amine. M.P.: 137° C. Analysis: C percent=78.53, H percent=7.81, N percent=4.01 (calc.: C percent=79.02, H percent=7.81, N percent=3.69).

The maleate is obtained from the base purified through the hydrochloric acid salt. The hydrochloric acid salt is suspended in benzene whereupon a 5 N aqueous sodium hydroxide solution is added. On prolonged shaking the base is set free gradually and may be obtained by concentration of the benzene layer.

8.0 g. of the purified base are dissolved in 50 ml. of 96% alcohol, and the solution of 7.00 g. of maleic acid in 75 ml. of water is added. On dissolving by boiling, the solution is treated with charcoal and filtered. 8.68 g. of the maleate are obtained, melting at 132–133° C., capable to be recrystallized from the solution of 96% alcohol and water. Analysis: C percent=75.88, H percent=6.98 (calc.: C percent=75.95, H percent=7.03).

*Example 6*

4.30 g. of β,β-diphenyl-propionaldehyde and 3.30 g. of 4-(γ-amino-butyl)-phenol—which was prepared by reduction of 4-oxy-benzyl-acetone-oxime (Arch. Pharm. 1927, 23)—are heated on a water bath for 20 minutes without any solvent. The melt is taken up in ethyl acetate and hydrogenated at 50–55° C. and atmospheric pressure in the presence of palladium charcoal. The volume of the hydrogen consumed represents 70 to 80% of the calculated amount. On filtration the solution obtained is concentrated to 10–12 ml. On staying or inoculation N-[1'-(4''-oxy-phenyl)-butyl-(3')] - 1,1 - diphenyl-propyl-(3)-amine precipitates in crystalline form. M.P.: 115–117° C.

*Example 7*

15.83 g. of γ,γ-diphenyl-propylamine and 12.30 g. of p-oxy-benzyl acetone are hydrogenated in a methanol as a medium in presence of charcoal. On filtration the solvent is removed and 30 ml. of ethyl acetate are added. The N-[1'-(4''-oxy-phenyl)-butyl-(3')] - 1,1, - diphenyl-propyl-(3)-amine is obtained in crystalline form. M.P.: 117–120° C. The base may be recrystallized from ethyl acetate. Analysis: C percent=83.17, H percent=8.11 (calc.: C percent=83.52, H percent=8.13).

16.25 g. of the above product are diluted in anhydrous alcohol and 6.40 g. of maleic acid are added. On dissolution, 75 ml. of ether are added whereupon 18.49 g. of the acidic maleate are obtained which may be recrystallized from a mixture of 25% of alcohol and 75% of water. M.P. 119–120° C. Analysis: C percent=73.28, H percent=6.90 (calc.: C percent=73.24, H percent=6.99).

Tested on dogs by intravenous use, the product shows the following effects (method of investigation: On introducing a Moravitz canula into the sinus coronarius of the animal, the blood flow leaving the sinus is conducted through a rotameter into the right vena femoralis. Blood pressure is measured in the arteria femoralis by means of a mercury manometer. The vagi on the neck of the animal are cut). Effect of the product lasts for a period of 15 to 30 minutes. The resistance sinks to 77.7% of the original value. Amount of the blood flowing increases to 115–120% of the original amount. Noradrenaline-mobilization similar to reserpine could be observed.

*Example 8*

15.83 g. γ,γ-diphenyl-propylamine and 14.6 g. of 3-methoxy-4-oxy-benzylacetone are hydrogenated in the presence of palladium charcoal in 200 ml. of methanol at 50–60° C. and a pressure of 4–10 atm., by introduction of gaseous hydrogen. After removal of the catalyst the solvent is evaporated and the remainder is dissolved in 800 ml. of ethyl acetate, whereupon 23.35 g. of N-[1'-(3''-methoxy - 4'' - oxy - phenyl)-butyl-(3')]-1,1-diphenyl-propyl-(3)-amine are obtained in the form of crystals on cooling. M.P. 111° C. Analysis: C percent =80.02, H percent=7.96, N percent=3.58 (calc.: C percent=80.17, H percent=8.02, N percent=3.60).

The hydrochloric acid salt melts at 154° C., the melt gets clear at 163° C. Analysis: C percent=72.89, H percent=7.65, N percent=3.43 (calc.: C percent=73.30, H percent=7.57, N percent=3.29).

Starting from 23.35 g. of the free base and using alcohol and ether as a medium 27.10 g. of the acidic maleate may be prepared on addition of 7.86 g. of maleic acid. On recrystallization from ethyl acetate 25.26 g. of the salt are obtained. M.P.: 120–123° C. Analysis: C percent=71.44, H percent=6.98 (calc.: C percent=71.26, H percent=6.98).

The product was tested on dogs according to the method described in Example 7. On administration of 1 mg./kg. doses and 2 mg./kg. doses the resistance sinks to 80 and 75.5% respectively of the starting value. The quantity of the flowing blood amounts to 100–110% of the starting quantity. The product was observed to be effective through a time period of 15 minutes. Using the method of Nieschultz the maleate salt shows coronary dilatant effects on rats (ED$_{50}$=5 mg./kg.). Toxicity: 38 mg./kg. i.v. on mice. Toxicity of the hydrochloric acid salt: DL$_{50}$=42.5 mg./kg. i.v. on mice.

*Example 9*

6.30 g. of β,β-diphenyl-propionaldehyde and 5.85 g. of 3-amino-1-(3-methoxy-4-oxy-phenyl)-butane are heated in a water bath. The melt is then dissolved in ethyl acetate and hydrogenated in the presence of palladium charcoal at 50–55° C. and atmospheric pressure by introduction of gaseous hydrogen. On removing of the catalyst the solution is concentrated, whereupon N-[1'-(3''-methoxy - 4'' - oxy-phenyl)-butyl-(3')] - 1,1 - diphenyl-propyl-(3)-amine is obtained in the form of crystals. M.P.: 115° C.

*Example 10*

16.31 g. of γ,γ-diphenyl-propylamine and 14.76 g. of dimethyl-amino-benzylacetone are hydrogenated in 200 ml. of methanol in the presence of palladium charcoal at 50–60° C. and 6 atm. pressure. The catalyst is filtered off and 29.37 g. of the crude product are obtained on evaporating the solvent. On addition of 16.70 g. of maleic acid 31.74 g. of the maleate of the product are obtained. M.P.: 103–105° C. On washing with water and recrystallization from alcohol N-[1'-(4''-dimethyl-amino-phenyl)-butyl - (3')] - 1,1 - diphenyl-propyl-(3)-amine-maleate is obtained in a pure state. M.P.: 147–148° C. Analysis: C percent=72.74, H percent=7.69, N percent=5.62 (calc.: C percent=72.77, H percent =8.00, N percent=5.85).

Coronary dilatant effects were observed when testing with the method of Nieschultz on rats (ED$_{50}$=5 mg./kg.). On administration of doses of 1 mg./kg. the blood pressure of cats narcotized by chloralose-urethane was found to decrease with 25–30 Hg mm.

What we claim is:
1. A compound selected from the group consisting of compounds of the formula:

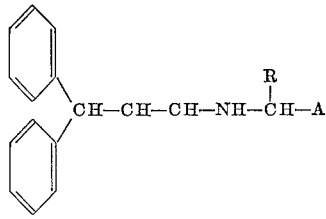

wherein R is a lower alkyl, and A is a member selected from the group consisting of radicals of the formulae.

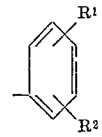

and

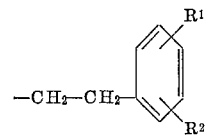

wherein $R^1$ is selected from the group consisting of hydrogen hydroxy, lower alkoxy and low dialkylamino, and $R^2$ is selected from the group consisting of hydrogen, hydroxy and lower alkoxy; and physiologically compatible salts thereof.

2. A compound selected from the group consisting of compounds of the formula

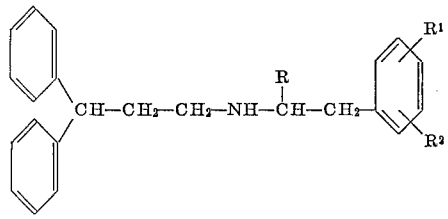

where R is ethyl, $R^1$ is selected from the group consisting of hydrogen, hydroxy, lower alkoxy and lower dialkylamino, and $R^2$ is selected from the group consisting of hydrogen, hydroxy and lower alkoxy; and physiologically compatible salts thereof.

3. N-[1'-phenyl-ethyl-(1')]-1,1 - diphenyl-propyl - (3)-amine.
4. N - [1' - phenyl-propyl-(1')] - 1,1 - diphenyl-propyl-(3)-amine.
5. N - [1' - phenyl-butyl - (2')] - 1,1 - diphenyl-propyl-(3)-amine.
6. N-[1'-phenyl-butyl-(3')] - 1,1 - diphenyl-propyl-(3)-amine.
7. N-[1'-(4''-oxy-phenyl)-butyl-(3')]-1,1-diphenyl-propyl-(3)-amine.
8. N-[1'-(3''-methoxy-4''-oxy-phenyl)-butyl-(3')]-1,1-diphenyl-propyl-(3)-amine.
9. N-[1'-(4''-dimethylamino-phenyl)-butyl - (3') - 1,1-diphenyl-propyl-(3)-amine.

References Cited by the Examiner

UNITED STATES PATENTS 3,116,330 12/1963 Krohs _____ 260—570
3,152,173 10/1964 Ehrhart et al. _____ 260—570 X

FOREIGN PATENTS 213,877 3/1961 Austria.
213,878 3/1961 Austria.
213,879 3/1961 Austria.

CHARLES B. PARKER, *Primary Examiner.*

ROBERT V. HINES, *Assistant Examiner.*